United States Patent [19]
Taguchi

[11] 3,809,330
[45] May 7, 1974

[54] WINDING LEVER DEVICE IN A CAMERA
[75] Inventor: Tatsuya Taguchi, Tokyo, Japan
[73] Assignee: Canon Kabushiki Kaisha, Tokyo, Japan
[22] Filed: Apr. 11, 1973
[21] Appl. No.: 350,196

[30] Foreign Application Priority Data
Apr. 29, 1972 Japan.............................. 47-43172

[52] U.S. Cl. ............... 242/713, 95/11 R, 242/71.3, 242/71.4
[51] Int. Cl. ......................................... G03b 1/06
[58] Field of Search.......... 95/31 R, 11 R; 242/71.3, 242/71.4

[56] References Cited
UNITED STATES PATENTS
3,605,598   9/1971   Zimmet.......................... 242/71.3 X Primary Examiner—Robert P. Greiner
Attorney, Agent, or Firm—Flynn & Frishauf and William R. Woodward

[57] ABSTRACT

A winding lever device in a camera for easily varying an allowance angle of the lever whenever necessary is disclosed. The device provides a plurality of releasable connecting means for varying the winding starting position and springs for maintaining the winding shaft and said lever in connected condition.

5 Claims, 7 Drawing Figures

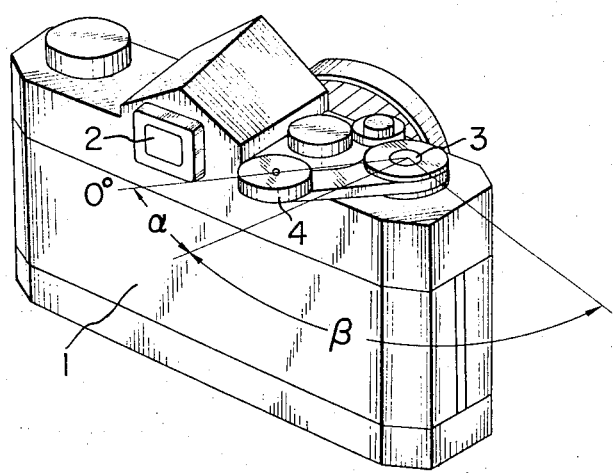
FIG. 1
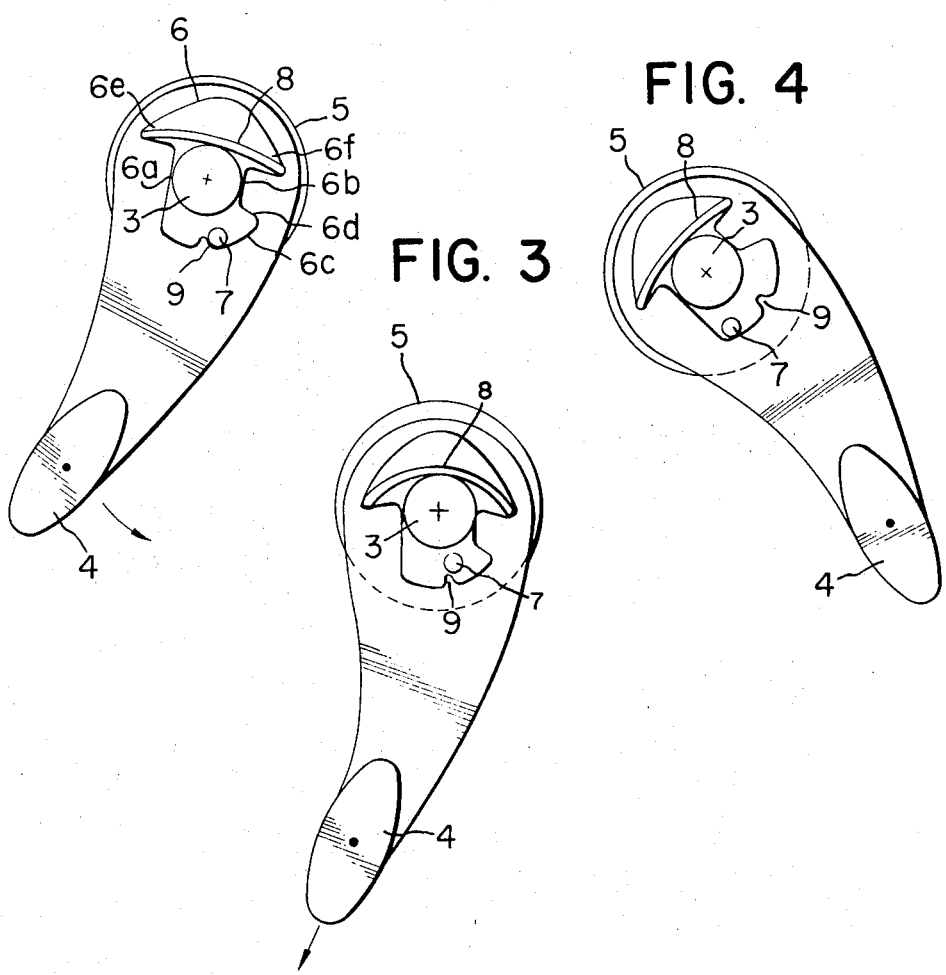
FIG. 2
FIG. 3
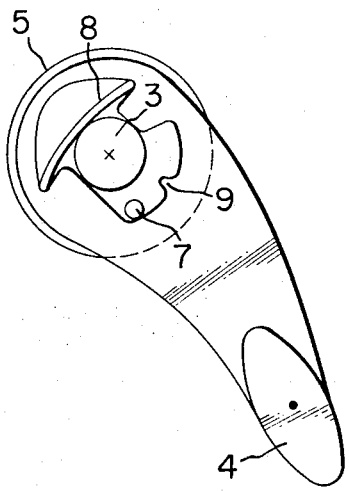
FIG. 4

PATENTED MAY 7 1974 3,809,330

WINDING LEVER DEVICE IN A CAMERA

BACKGROUND OF THE INVENTION

1. Field of the Invention

The present invention relates to film feed and shutter charge levers in cameras, and more particularly to winding lever devices in cameras.

2. Description of the Prior Art

A conventional winding lever in a camera is so designed that a play angle is provided between the position of the lever when the camera is in its case and the position where winding commences, and so that in winding the finger of the photographer completely holds the winding lever in order to facilitate winding operation. However, the play angle (allowance angle) can not be varied.

In single lens reflex cameras the finder window is generally in the central position of the camera so that when attempt is made to perform winding while viewing the finder, in a case of continuous photographing, the winding lever springing back to its encased position may strike the face of the observer and make winding impractical during viewing.

Further, if winding is performed from the position less close to the face when viewing by enlarging the allowance angle of the winding lever, winding is not convenient when in normal use.

SUMMARY OF THE INVENTION

The invention eliminates the above inconveniences by the provision in which the allowance angle of the winding lever can be easily varied by the photographer whenever necessary.

The invention will now be described in detail by way of embodiments referring to accompanying drawings.

BRIEF DESCRIPTION OF THE DRAWINGS

FIG. 1 is a view showing the exterior of a camera to which the invention is applied.

FIG. 2 to 4 are plan views illustrating the modes of operation in a first embodiment of the device.

DESCRIPTION OF THE PREFERRED EMBODIMENTS

Figure 5:
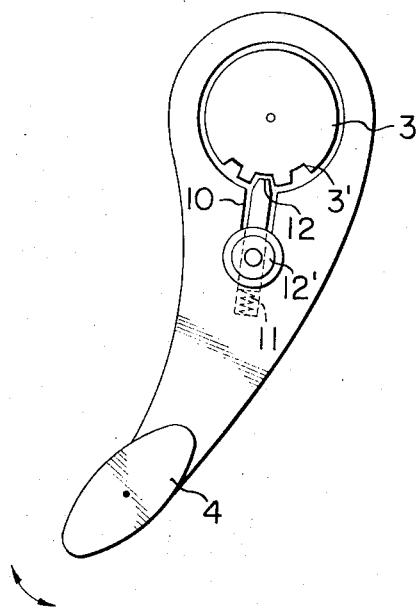
FIGS. 5 and 6 show a second embodiment, FIG. 5 showing a plan view of the lever and FIG. 6 being its section.

Referring now to FIG. 1, there are shown a camera body 1, a window 2 of the finder, a winding shaft 3 interlocked with the film feed and shutter charge mechanism, and a winding lever 4 for actuating the shaft 3. When not in use, the winding lever 4 is encased in its initial position as shown in FIG. 1 and rotates at an angle $\alpha$ from said initial position to the position where operation commences without actuating the shaft 3 and then engages with the shaft 3 from the said operation starting position being rotated at an angle $\beta$ to cause the film feed and shutter charge mechanism to operate.

In the first embodiment, the winding lever 4 has a hole 6 of the shape shown in FIG. 2 and a leaf spring 8 caught between the cusp portions 6e and 6f of the hole. The straight line portions 6a and 6b of the hole edge are placed in contact with the shaft 3, an arcuate portion 6c is held by contact with a pin 7 on the winding base seat 5 integral with the shaft 3, cooperating either with an engaging projection 9 with the end of straight line edge 6a provided intermediate of the arched portion 6c. Engagement of either of these with the pin 7 can transmit turning force to the shaft 3.

FIG. 2 shows the winding lever 4 already drawn away from the encased position into the winding starting position. The pin 7 is here in engagement with the right side of the projection 9. When the lever 4 is rotated from the aforesaid position at an angle of $\beta$ in a direction indicated by the arrow, the winding shaft 3 is rotated by the pin 7 to perform film feeding and shutter charging. When the lever is rotated in a direction opposite to the position shown in FIG. 2, the lever 4 alone rotates by no more than the allowance angle $\alpha$, with the winding shaft 3 remained stopped, and when the edge 6d of the hole 6 strikes on the pin 7, the stopped lever is then in its initial encaseable position.

In the case the winding starting position of the lever is desired to be varied, the lever 4 is pulled in a direction shown by the arrow against the spring 8 to disengage the engaging projection 9 with the pin 7 as shown in FIG. 3 and then the lever is slightly rotated in a clockwise direction. When the hand is thereafter released, the pin 7 is brought in contact with an arcuate portion on the left hand of the projection 9, as shown in FIG. 4.

In this condition, when the lever 4 is rotated in a clockwise direction and the end of straight line edge portion 6a of the hole 6 comes into contact with the pin 7, winding is started and when the lever is then rotated by a further angle $\beta$, as in the case as previously described, winding is completed.

As is apparent from the above-described explanation, both winding starting position and initial position are varied when the pin 7 is shifted from the right side to the left side of the projection 9 of the lever, while the angle of movement the lever is the same in either case.

Figure 6:
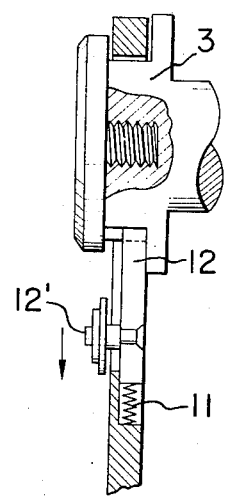

FIGS. 5 and 6 show a second embodiment in which a slidable engaging piece 12 is provided to selectively engage with one of a plurality of grooves or notches 3' in the winding shaft 3, so that the winding starting position may be varied. This engaging piece 12 is fitted in a groove 10 and pressed by a spring 13 towards the shaft 3 to cause the extremity of said piece to fit into the groove 3' of the shaft 3. Further, mounted on the upper surface of the piece is a change-over knob 12'. When said knob is pressed in a direction as indicated by the arrow in FIG. 6 against the spring 11, the engaging piece 12' is brought out of engagement with the groove 3' to free the lever 4 to rotate so that the engaging piece 12 may be placed into engagement with another groove providing shifted starting and winding positions of the lever.

Figure 7:
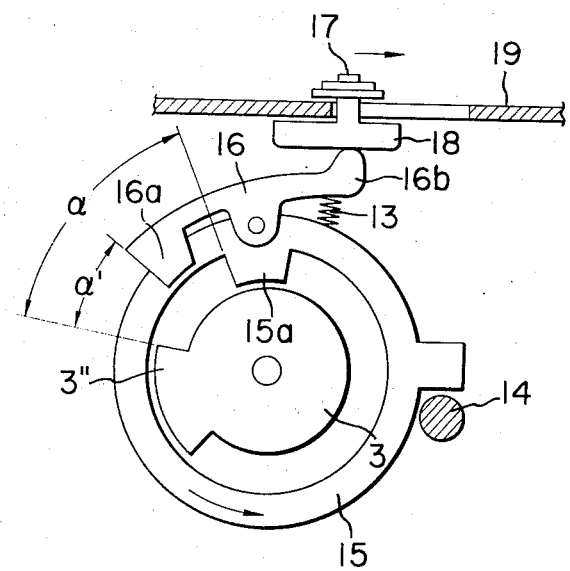
FIG. 7 is a cross section of a third embodiment.

FIG. 7, further shows a third embodiment in which a projection 15a, engageable with a stepped portion 3'' of the winding shaft 3, is on an internal edge of formed a base seat 15 integrally formed with a winding lever not shown, and a change-over lever 16 having an extremity 16a adapted to engage with said stepped portion 3'' is rockably pivoted on the base seat 15. A change-over plate 18 having a change-over knob 17 is slidably mounted on the upper cover 19 of the camera, and in the position shown in FIG. 7 the tail end 16b of the change-over lever 16 is pressed by the spring 13 to engage with the change-over plate 18 while the extremity 16a thereof is held in a position out of all possible engagement with the stepped portion 3''. In this condition, when the winding lever is rotated in a direction shown by the arrow, the base seat 15 is rotated with the tail end 16b of the change-over lever being placed in contact with the surface of the change-over plate 18 so that the extremity 16a of the change-over lever is not engaged with the stepped portion 3'' to stop the shaft 3. When the base seat 15 is rotated through an angle of $\alpha$, the projection 15a thereof is brought in engagement with the stepped portion 3'' of the shaft 3 to start winding. When it is desired to vary the winding starting position, the change-over knob 17 is pressed in a direction indicated by the arrow, the change-over plate 18 is disengaged from the tail end 16b of the change-over lever so that the change-over lever 16, depressed by the spring 13, rotates in a counterclockwise direction until the extremity 16a thereof moves into a position suitable for engaging the stepped portion 3''. Then, in this condition, if the winding lever is rotated, the change-over lever is placed in contact with the shaft 3 after the play of angle $\alpha'$ and thereafter causes winding to start.

As described above, the invention provides a construction such that the winding starting position can be varied by an operation from outside the camera, so that it can be made convenient and efficient for operation of the rapid wind lever while viewing through the finder without sacrifice of a convenient rapid wind operation while the camera is not in viewing position, enhancing the versatility of camera performance.

I claim:

1. A winding lever device in a camera having means for shifting at least the lever position at the start of winding, comprising:
   a winding lever (4);
   a winding shaft (3);
   a linkage therebetween combined with spring return means for said lever and allowing free play of said lever in the neighborhood of the spring return position of said lever and providing a driving engagement over a drive angle ($\beta$) adjacent the opposite extreme position of said lever, and
   a shiftable element shiftable radially with respect to the cross-section of the winding shaft for varying the angular position of the lever at which driving engagement between the winding lever and the winding shaft begins when the lever is rotated for winding.

2. A winding lever device as defined in claim 1 in which said shiftable element is maintained in position by spring means (8,11,13) and is shiftable only under actuation in opposition to said spring means.

3. A winding lever device as defined in claim 1 in which said shiftable element is provided by a contoured hole in a flat portion of said winding lever surrounding said winding shaft disposed parallel to a seat flange fixed with respect to said winding shaft, projection means on said seat flange penetrating into said hole and arranged to engage with the contour thereof for transmitting drive from said lever to said shaft and leaf spring means held in said contoured hole engaging said shaft for normally holding said projection means against said contour and arranged to permit shift of said flat portion of said lever diametrally with respect to said shaft so as to release said projection means from engagement with said contour and to permit rotation of said lever so as to allow said leaf spring means to hold said projection means against a different portion of said contour providing a different engagement angle of said lever at the start of winding action.

4. A winding lever device as defined in claim 1 in which said shiftable element is provided by spring pressed radially disposed engagement means (12) seated on said winding lever (4) and notch means (3') at a plurality of positions disposed circumferentially on said winding shaft at locations suitable for receiving said engagement means (12), said engagement means being provided with actuating means (12') for manually withdrawing said engagement means against spring pressure from said notch means to allow rotation of said lever (4) for providing engagement of said engagement means in a different position of said notch means.

5. A winding lever device as defined in claim 1 in which said winding lever is connected with base seat means (15) surrounding said winding shaft (3) and having projection means (15a) internally thereof for engagement with external projection means (3'') provided on said winding shaft (3) inside said base seat means (15), and in which said shiftable element is a detent extremity (16a) provided on rocker means (16) pivoted on said base seat means (15) and provided with spring means (13) urging said detent extremity (16a) into position for engagement with said external projection means (3'') of said winding shaft prior to arrival of said base seat means (15) into a position in which said internal projection means (15a) of said base seat means reaches such engagement during actuation of said winding lever, and in which manually shiftable cam means are provided having one position in which said rocker means is thereby actuated against said spring means (13) to hold said detent extremity (16a) out of possible engagement with said external projection means (3'') of said winding shaft, and having another position in which said spring means (13) is allowed to urge said rocker means (16) to place said detent extremity (16a) in position for engagement as aforesaid.

* * * * *